(12) United States Patent
Henry, Sr. et al.

(10) Patent No.: US 8,720,389 B2
(45) Date of Patent: May 13, 2014

(54) METHOD AND APPARATUS FOR CONTROLLING AN ELECTRIC MOTOR AND AN INTERNAL COMBUSTION ENGINE

(75) Inventors: Zachary A. Henry, Sr., Corryton, TN (US); Ricky L. Gammons, Lafayette, TN (US)

(73) Assignee: Petrolfree, Inc., Corryton, TN (US)

(*) Notice: Subject to any disclaimer, the term of this patent is extended or adjusted under 35 U.S.C. 154(b) by 306 days.

(21) Appl. No.: 13/360,360

(22) Filed: Jan. 27, 2012

(65) Prior Publication Data

US 2012/0125270 A1  May 24, 2012

Related U.S. Application Data

(63) Continuation-in-part of application No. 12/203,621, filed on Sep. 3, 2008, now Pat. No. 8,141,523.

(51) Int. Cl.
*F02B 43/08* (2006.01)

(52) U.S. Cl.
USPC .................. 123/3; 123/1 A; 210/243

(58) Field of Classification Search
USPC ........... 123/1 A, 3, DIG. 12, 25 R, 25 E, 536, 123/538; 429/411, 418, 67–70, 113; 210/243; 204/623, 668, 222, 212
See application file for complete search history.

(56) References Cited

U.S. PATENT DOCUMENTS

| | | |
|---|---|---|
| 308,276 A | 11/1884 | Paine |
| 583,104 A | 5/1897 | Wattles |
| 1,262,034 A | 4/1918 | Frazer |
| 1,396,919 A | 11/1921 | Brace |
| 2,145,468 A | 1/1939 | Wangemann |
| 3,228,863 A | 1/1966 | Wanttaja et al. |
| 3,294,586 A | 12/1966 | Le Duc |
| 3,459,953 A | 8/1969 | Brauser et al. |
| 3,648,668 A | 3/1972 | Pacheco |
| 3,970,070 A | 7/1976 | Meyer |
| 4,099,489 A * | 7/1978 | Bradley .................. 123/3 |
| 4,111,160 A | 9/1978 | Talenti |
| 4,112,875 A | 9/1978 | Fletcher et al. |
| 4,265,224 A | 5/1981 | Meyer |
| 4,275,950 A | 6/1981 | Meyer |
| 4,389,981 A | 6/1983 | Meyer |
| 4,394,230 A | 7/1983 | Punharich |
| 4,421,474 A | 12/1983 | Meyer |
| 4,465,455 A | 8/1984 | Meyer |
| 4,613,304 A | 9/1986 | Meyer |
| 4,613,779 A | 9/1986 | Meyer |
| 4,798,661 A | 1/1989 | Meyer |
| 4,826,581 A | 5/1989 | Meyer |
| 4,936,961 A | 6/1990 | Meyer |
| 5,149,407 A | 9/1992 | Meyer |
| 5,156,114 A | 10/1992 | Gunnerman |
| 5,293,857 A | 3/1994 | Meyer |
| 6,559,566 B2 | 5/2003 | Modi et al. |
| 7,036,616 B1 | 5/2006 | Keijha |

* cited by examiner

*Primary Examiner* — Hung Q Nguyen
(74) *Attorney, Agent, or Firm* — Pitts & Lake, PC

(57) ABSTRACT

Method and apparatus for controlling an electric motor employing an electrolysis subassembly connected in an electrical circuit which includes the electric motor. While controlling the throughput of electrical current through the electrolysis subassembly, a fuel gas useful for fueling an internal combustion engine is simultaneously generated. The invention includes a novel electrolyte utilizing novel electrode structure and mode of operation.

18 Claims, 4 Drawing Sheets

METHOD AND APPARATUS FOR CONTROLLING AN ELECTRIC MOTOR AND AN INTERNAL COMBUSTION ENGINE

CROSS-REFERENCE TO RELATED APPLICATIONS

This application is a continuation-in-part of prior U.S. patent application Ser. No. 12/203,621, filed Sep. 3, 2008, which is incorporated herein by reference.

STATEMENT REGARDING FEDERALLY-SPONSORED RESEARCH OR DEVELOPMENT

Not Applicable

BACKGROUND OF THE INVENTION

1. Field of Invention

This invention relates to methods and apparatus for controlling the operation of an electric motor or an internal combustion engine (ICE). As a beneficial byproduct, there is generated a volume of fuel gas suitable for a variety of uses.

2. Description of the Related Art

Electric motors commonly require means to control the operational speed of the motor(s). For example, in the prior art, control over the speed of rotation of the motor rotor, hence the rotational output of the motor shaft, has taken the form of variable resistors, rheostats, and like devices for adjusting the electrical input employed to drive the motor, such as the input voltage or amperage of the current being fed to the motor. Such prior art devices most commonly generate significant amounts of heat during operation of the motor. They further commonly are limited to specific ranges of electrical input, e.g. between "X and "Y" volts, "X" and "Y" being chosen, among other things, to provide sufficient power for driving the motor, while minimizing the heat generated by the control device. Such devices are subject to damage by overheating and/or electrical spikes (both high and low) and/or overvoltage or undervoltage.

Electronic motor controllers have been employed. These controllers may exhibit lesser heat problem, but they are most sensitive to damage by electrical spikes and/or overvoltages or undervoltages. In some instances, these devices overheat and have been known to be the source of disastrous fires.

Control of the operation of internal combustion engines (ICES) is conventionally achieved employing control over the quantity of a stream of combustible gas(es) introduced to the engine by means of a carburetor, for example. Fuel injection also has been employed in similar manner. In each instance, the concept involves feeding of a suitable mixture of air and a combustible gas such as petroleum-based products (gasoline, diesel fuel, etc.) and fuels labeled as biomass fuels, hydrogen, and the like. Alternatively, the prior art has also included the concept of employing electric motors in addition to, or in lieu of, ICEs. Alternative fuel(s) are actively being sought which can reduce the adverse effects on the environment attributable to their use and/or which are less expensive than currently available fuels and/or whose sources are abundantly available and renewable. Combinations of these fuels and other motor vehicle powering concepts have had only limited success for various reasons such as cost, availability, storage and delivery to consumers, etc.

BRIEF SUMMARY OF THE INVENTION

In accordance with one aspect of the present invention there is provided a method and apparatus for controlling motors, either an electric motor, an ICE or both an electric motor and an ICE, in combination, at times simultaneously. The controller of the present invention employs electrolysis of a novel electrolyte utilizing novel electrode structure and mode of operation, thereby producing a novel fuel gas under controlled conditions for fueling an ICE. Such controlled conditions preferably include the control of that quantity per unit of time of electrical energy throughputted by the electrolysis unit for driving an electric motor or that quantity per unit of time of a gaseous stream generated within the electrolysis for fueling an ICE, for example. That is, in the present invention, there exists the ability to simultaneously control electrical power being fed through an electrolysis unit to an electric motor and a fuel gas for fueling an ICE employing the same source of potential energy.

For present purposes, the term "fuel gas" may include a single gas (e.g. hydrogen) or a mixture of gases (e.g. hydrogen, oxygen, water vapor or steam and/or other chemical entities). Moreover, a fuel gas of the present invention may include minor and/or non-essential components either alone or combined with hydrogen, oxygen or nitrogen, for example. Thus the term "fuel gas" should be understood to include a single gas or a mixture of gases as the context dictates, suggest or implies. Moreover, herein, the term motor may be employed to designate either an electrically powered motor (alternating current or direct current) or an ICE depending upon the context in which the term is used.

As noted, in accordance with the present invention, the novel fuel gas is generated onsite, such as onboard a motor vehicle, or at a site remote from commonly employed sources of power for driving an electric motor, for example.

The electrolysis process of the present invention may be powered by a battery or battery pack in an electrical circuit which includes the motor. The electrodes of the electrolysis unit include first and second, preferably planar, electrically conductive plates, which are electrically connected to collectively define a first electrode. These parallel plates are mounted in registered, spaced-apart, substantially parallel planar relationship to one another within the electrolyte and are adjustable with respect to their spaced apart spatial relationship. There is further included a planar second plate electrode of substantially like size and geometry as the first and second plates of the first electrode. This second electrode is movable between a first position out of the electrolyte (hence out of register with the plates of the first electrode) and a second position within the electrolyte and partially or substantially fully interposed between the first and second plates, and substantially equidistant from and aligned (in register) with the first and second plates of the first electrode. According to one aspect of the present invention, the degree of registration of the second electrode with the first and second plates of the first electrode establishes the rate of electrolysis of the electrolyte, hence the control of voltage drop across the electrolysis unit, hence provides for control, in the nature of a variable resistor, over the operation of an electric motor which is electrically connected in an electrical circuit with the electrolysis unit. A stream of fuel gas emanates from the electrolysis unit of the present invention. This fuel gas may be directed to any of several beneficial uses, a principal one of which is to fuel the operation of an ICE.

In accordance with a further aspect of the present invention, the overall energy output from the electric motor and internal combustion engine has been found to be sufficient to provide a degree of operational mechanical energy required to drive a variety of equipment and also to provide sufficient excess energy for charging of the battery pack employed to power the electrolysis unit under useful operational conditions. Still further, as desired, all or a portion of the gaseous output stream from the electrolysis unit may be captured and stored for future use.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A method and apparatus for controlling an electric motor and an internal combustion engine is disclosed employing an electrolysis subassembly connected in an electrical circuit which includes the electric motor. As will be further described hereinbelow, the apparatus and associated method incorporates power from an electric motor and an internal combustion engine fueled by a fuel gas produced through electrolysis of an electrolyte within an electrolysis unit. The electrolysis unit is further used to control the operational speed of the electric motor. An electric generator is coupled to a battery for provision of electrical current used to power the electrolysis unit for electrolysis of the electrolyte and for control of the electric motor.

Figure 1:
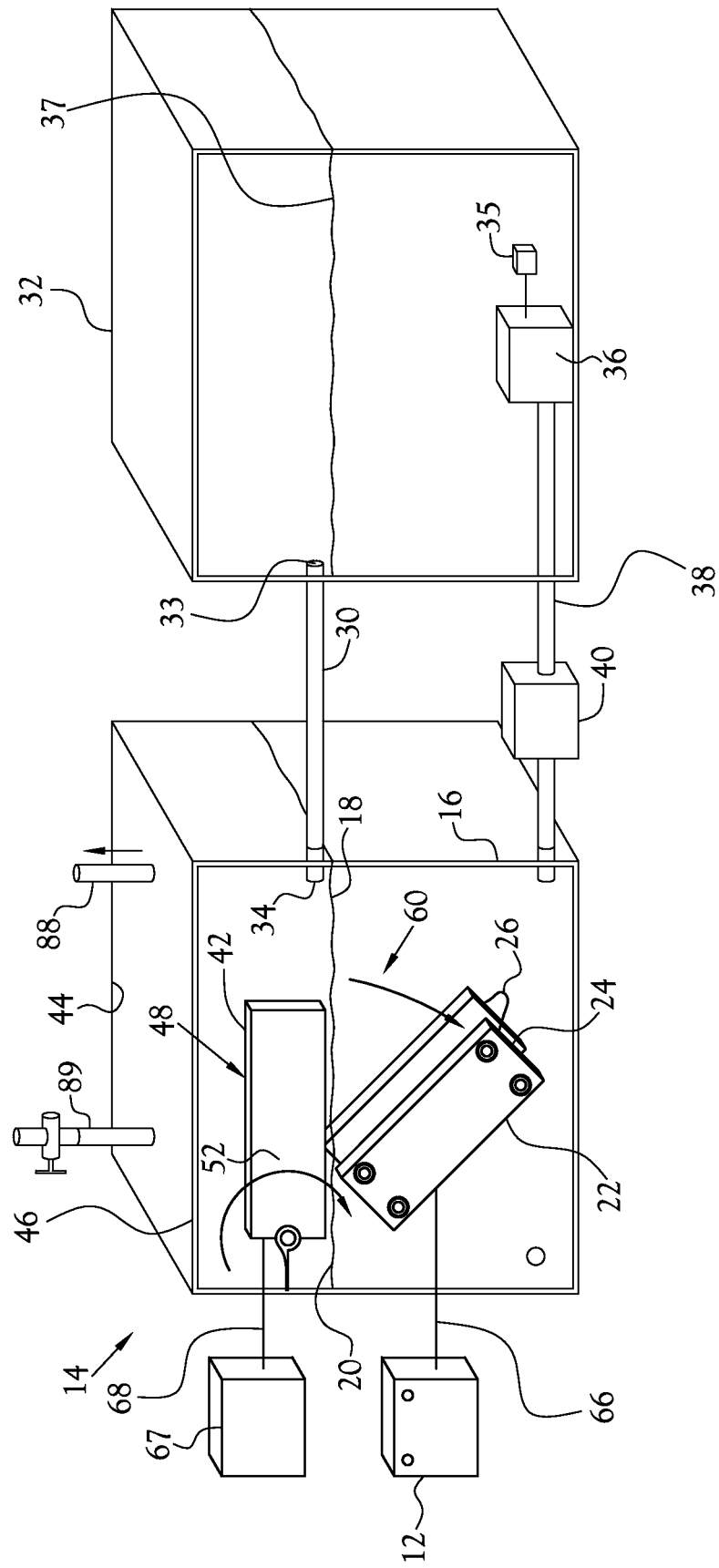
FIG. 1 is a schematic representation of one embodiment of the system of the present invention.

FIG. 1 depicts one embodiment of an apparatus useful for carrying out various aspects of the present invention. The depicted apparatus includes a battery pack 12 which serves as a source of electrical energy for powering an electrolysis unit 14. In the embodiment depicted in FIG. 1, the electrolysis unit 14 includes a first tank 16 adapted to contain a quantity of an electrolyte 18. Also contained within the first tank and at a level beneath the upper surface 20 of the electrolyte within the tank, are first and second plates 22 and 24, respectively. Referring to FIGS. 1-4, these two plates are adjustably mounted, by means of bolts 96 within the first tank 16 beneath the upper surface level 20 of the electrolyte 18 disposed within the first tank 16, for selectively adjusting their spatial relationship. As seen in FIGS. 3 and 4, the first and second plates 22, 24 are disposed in spaced apart, registered, parallel relationship to one another. Further, these two plates are electrically connected to one another as by means of an electrical conductor 26 in a manner which causes these plates to collectively define a single electrode, deemed the first electrode 28 for purposes of the present invention.

In several embodiments, the level 20 of electrolyte 18 within the first tank 16 is maintained substantially constant. For example, in the illustrated embodiment, the first tank 16 is connected in fluid flow communication as by a conduit 30 with a second tank 32 which is adapted to receive and contain a quantity of electrolyte in reserve for selective transfer into and/or through the first tank 16. Initially, the second tank is provided with a selected maximum volume of the same electrolyte as is disposed within the first tank. Over time, through depletion of the electrolyte within the first tank, replenishment electrolyte disposed within the second tank is transferred from the reserve tank to the first tank. In the embodiment depicted in FIG. 1, the conduit 30 interconnecting the first and second tanks 16, 32 includes an inlet end 34 which is disposed slightly above the surface level 20 of a desired quantity of electrolyte 18 contained in the first tank 16 and an outlet end 33 which is disposed above a surface level 37 of electrolyte contained in the second tank 32. Furthermore, in the illustrated embodiment, the conduit 30 is shaped and configured to allow free flow of electrolyte 18 along the conduit 30 between the first and second tanks 16, 32. Thus, electrolyte 18 from the first tank 16 will freely flow by gravity from the first tank 16 into the second tank 32 so long as the level of electrolyte in the first tank 16 remains at or above the level of the input end 34 of the conduit 30 leading to the second tank 32, and so long as the hydraulic head of electrolyte in the first tank 16 remains above the hydraulic head of electrolyte in the second tank 32. For purposes of ensuring controlled flow of electrolyte 18 from the second tank 32 into the first tank 16, there may be provided a pump 36 which is submerged within the electrolyte in the second tank 32 and is controlled by a thermostat 35. The output flow of electrolyte from the pump 36 is fed through a conduit 38 to the first tank 16. Air intake to the first tank is provided by a valved air vent 89 mounted in the top 90 of the first tank 16.

It will be understood that operation of the electrolysis unit 14 as further described herein below generates heat which may raise the temperature of the electrolyte 18 disposed within the first tank above an optimum operating temperature, for example an operating temperature of between about 120 and about 160 degrees, preferably about 150 degrees, Fahrenheit. Accordingly, in certain embodiments, regulation of the temperature of the electrolyte 18 disposed within the first tank 16 is provided. For example, in one embodiment, interposed within the length of the conduit, there may be provided a cooling device, such as a radiator 40 capable of cooling the electrolyte flowing from the second tank 32 into the first tank 16 within a selected desired range of temperatures. Power for operation of the pump 36 is provided by the battery pack 12 through suitable electrical connections (not shown) of the type known to one of skill in the art. Other temperature control means may be employed as desired. The radiator 40 provides a cooling means, such that heat generated within the electrolysis unit 14 is dissipated via the radiator 40 so that the temperature of the electrolyte within the first tank 16 can be maintained substantially constant at a preselected temperature or range of temperatures. Such temperature regulation of the electrolyte 18 further serves to maintain the level of effective electrolyte 18 contained within the first tank 16 substantially constant as the electrolyte is depleted over time. Moreover, this same regulation enhances the retention of a constant composition of the electrolyte 18 within the first tank 16, thereby contributing to the generation of an electrical throughput from the electrolysis unit 14 which is substantially constant over time for any given rate of electrolysis of the electrolyte 18 within the first tank 16.

As further depicted in FIG. 1, there is provided a second electrode 42 mounted within the first tank 16 at a location between opposite side walls 44 and 46 of the first tank 16. The second electrode 42 is movable between a first position 48 out of the electrolyte 18 disposed within the first tank 16 and a second position 56 (FIG. 4) within the electrolyte 18 within the first tank 16. This second electrode is desirably of substantially the same geometry and dimensions as each of the first and second plates 22, 24 of the first electrode 28. In the embodiment shown in FIG. 3, the second electrode 42 is mounted on a shaft 50, for example, located adjacent one end 52 of the second electrode 42, for movement within a plane which can result in the second electrode being disposed between, spaced substantially equidistantly apart from, and substantially parallel with respect to the planar orientations of the first and second plates 22, 24 of the first electrode 28.

As depicted in FIGS. 3 and 4, in one embodiment of the second electrode 42 and its mounting within the first tank 16 and into and out of the electrolyte 18, the second planar electrode has one end 52 thereof mounted on a stub shaft 50 which is mounted between the opposite side walls 44 and 46 of the first tank 16 at a level sufficiently above the surface level 20 of the electrolyte 18 disposed within the first tank as permits the movement of the second electrode 42 between its first position 48 fully out of the electrolyte 18 and its second position 56 at least partially in register with and between the first and second plates 22, 24 of the first electrode 28. In the depicted embodiment of FIG. 3, rotation of the stub shaft 50 swings the outboard end 58 of the second electrode 42 along a curved path 60 to move this second electrode between its first and second positions 48, 56. Rotation of the stub shaft 50 may be effected by any of several means. For example, in the embodiment of FIG. 3, the stub shaft projects through a side wall 46 of the first tank 16. That portion of the stub shaft 50 which projects beyond the outer surface of the first tank 16 wall includes a lever arm 64 attached thereto, the movement of which may effect rotation of the stub shaft 50 and associated second electrode 42 as desired. By means of the adjustability of the spacing between the first and second plates 22, 24 of the first electrode 28, a substantially unlimited electrical resistance range with unlimited voltage drop within the range of the battery pack may be achieved employing the present electrolysis unit 14.

From the foregoing, it will be recognized that movement of the second electrode 42 into the electrolyte and between the first and second plates 22, 24 of the first electrode 28 establishes a variable resistance path for the movement of ions and electrons causing a flow of electrical current between the first and second plates 22, 24 of the first electrode 28 and the second electrode 42 with resultant controlled flow of an electrical current within an external circuit that includes an electric motor.

Figure 2:
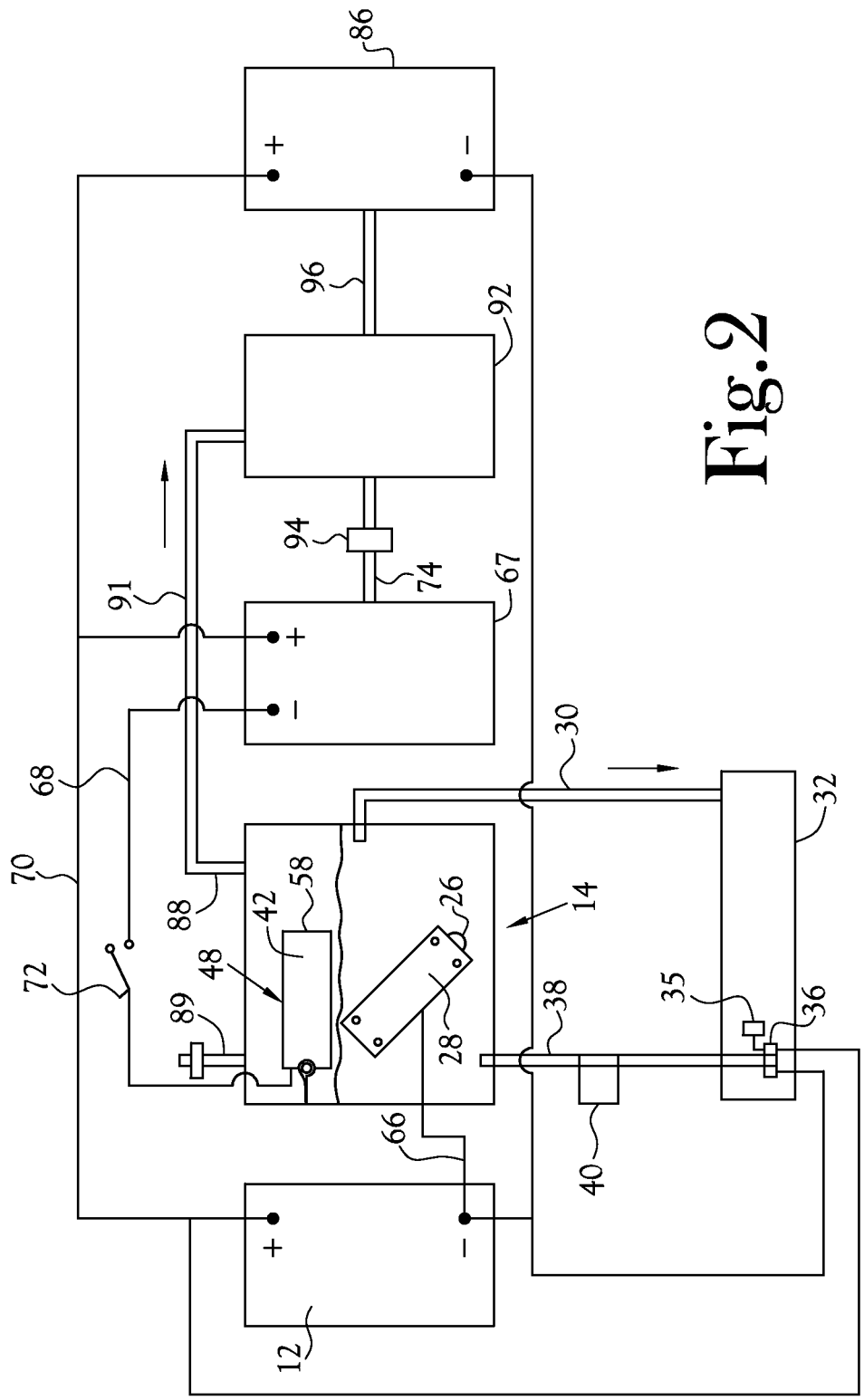
FIG. 2 is further schematic representation of the system of FIG. 1 and including a diagrammatic representation of one embodiment of electrical circuitry, among other features, associated with the system depicted in FIG. 1.
Figure 3:
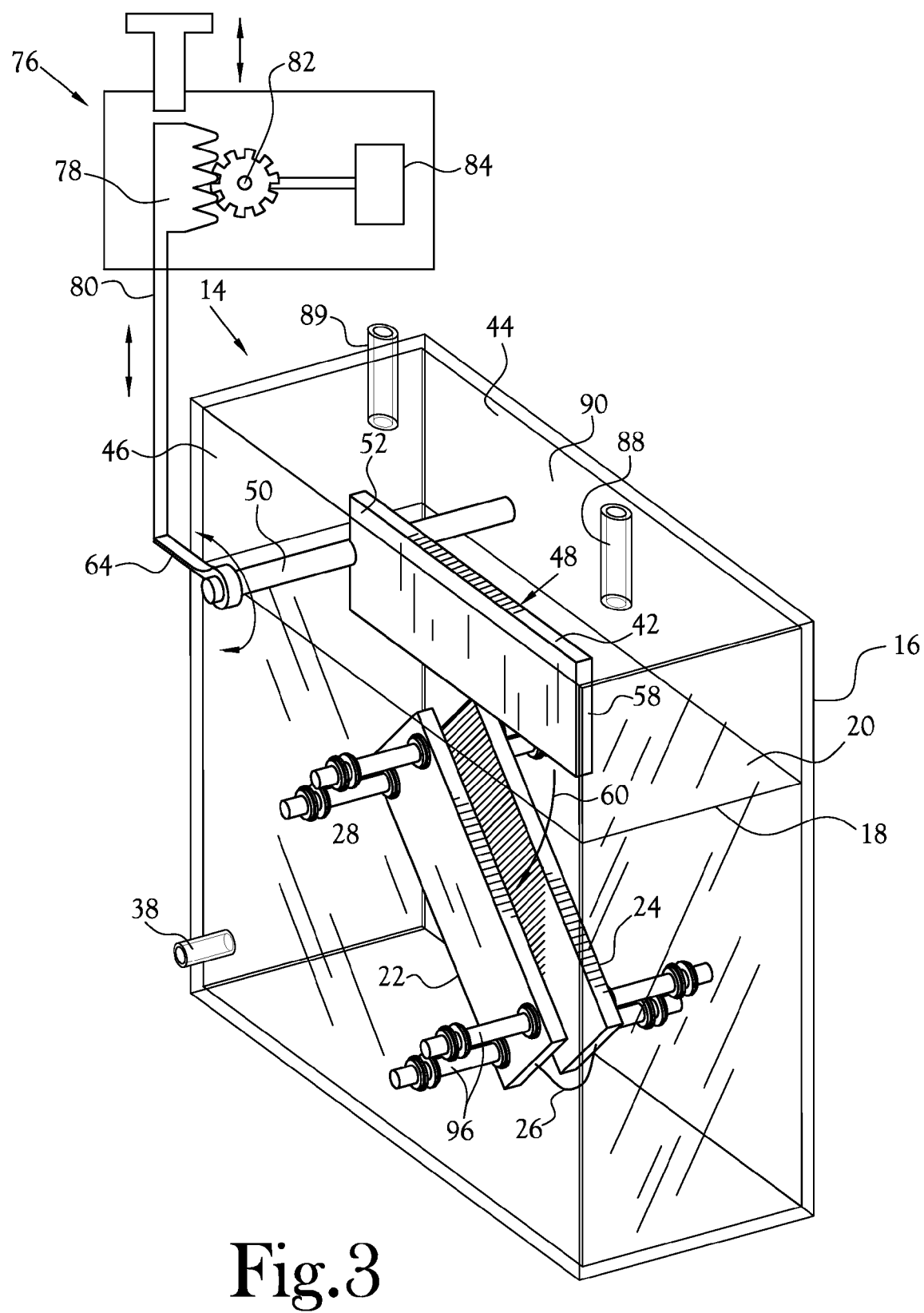
FIG. 3 is a perspective schematic representation of one embodiment of an electrolysis unit useful in the present invention.
Figure 4:
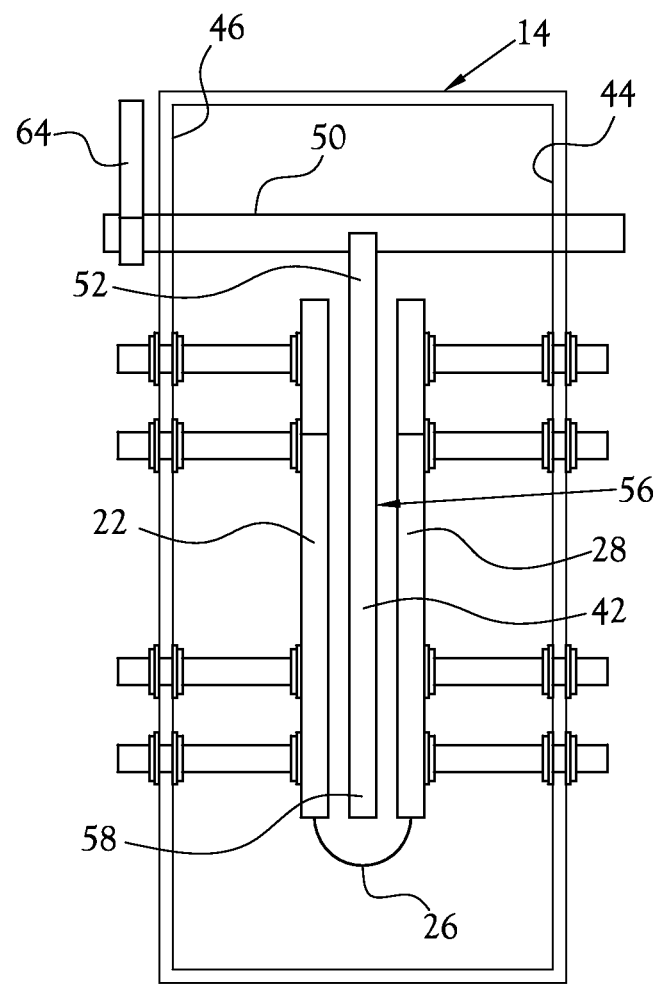
FIG. 4 is an end plan view of an electrolysis unit as depicted in FIG. 3.

More specifically, with reference to FIGS. 2-4, in one embodiment of the present invention, electrolysis of the electrolyte 18 takes place within the first tank 16. The first and second plates 22, 24 of the first electrode 28 are fixedly mounted between the opposite side walls 44, 46 of the tank in spaced apart, registered relationship to one another. The spacing between these plates is chosen to be sufficient to permit the free movement of the second electrode 42 between the parallel planes of the first and second plates 22, 24 in a plane substantially parallel to the planes occupied by these plates. As is noted, the second electrode 42 is mounted to be positioned either fully outside the volume of electrolyte 18 or positioned within the electrolyte 18 within the tank 16 and either partially or substantially fully between the first and second plates 22, 24 of the first electrode 28. When the second electrode 42 is disposed fully outside the volume of electrolyte 18, no electrolytic action takes place within the first tank 16.

As depicted in FIGS. 1 and 2, the first electrode 28 is electrically connected to the negative post of a battery pack 12 by an electrical conductor 66 and the second electrode 42 is connected to the negative post of an electric motor 67 as by an electrical conductor 68. The positive post of the electric motor 67 is electrically connected to the positive post of the battery pack 12 as by an electrical conductor 70 to define an electrical circuit which contains components disposed externally of the tank. A switch 72 may be interposed in the electrical conductor 70 to open and close the aforesaid external electrical circuit.

As noted, when the second electrode 42 is disposed outside the electrolyte 18 within the first tank, substantially no electrolytic action takes place within the first tank 16 and substantially no electrical current flows to the electric motor 67. Upon rotation of the second electrode 42 into the volume of electrolyte 18 within the tank 16 and into proximity to the first electrode 28, electrolysis of the electrolyte 18 commences within the first tank 16. When the switch 72 is closed, electrical current from the battery pack 12 flows through the external circuit including the electric motor 67, causing the motor to function. As is well known in the art, an output shaft 74 of the electric motor 67 may be connected to and provide motive power to any of a very large number and variety of devices, apparatus, etc. Further, it will be noted that as the second electrode 42 is moved toward a position of substantial registration of the second electrode with the first and second plates 22, 24 of the first electrode 28, the electrical resistance between the first and second electrodes 28, 42 decreases, thereby increasing the rate of electrolysis of the electrolyte 18 and resultant increase in the electrical current throughput of the electrolysis unit 14.

Control over the physical position of the second electrode 42 relative to the space between the first and second plates 22, 24 of the first electrode 28 may be accomplished by any of several means. In FIG. 3, rotation of the mounting shaft 50 of the second electrode 42 is employed to rotate the second electrode 42 into and/or out of the volume of electrolyte 18 disposed within the first tank 16. In the depicted embodiment, there is provided a lever arm 64 fixedly secured to the mounting shaft 50 for the second electrode 42. Rotational movement of this lever arm 64 effects rotation of the mounting shaft 50, hence movement of the second electrode 42 into and out of the volume of electrolyte 18 disposed within the first tank 16. In one embodiment, the operation of the lever arm 64 may be effected by means of a rack and pinion gear set 76, the rack 78 of which is mechanically connected to the outboard end of the lever as by a connecting rod 80. Movement of the rack may be carried out by physically moving the rack up or down as seen in FIG. 3, or by driving the movement of the rack via the pinion gear 82 driven by a powered motor 84 or other power source. In any event, operation of the lever arm 64 establishes the degree of submersion of the second electrode 42 into the electrolyte 18, hence the rate of electrolysis taking place within the first tank 16, hence the amount of the current throughput of the electrolysis unit 14.

Through the management of the amount of current throughput of the electrolysis unit 14, there is management of the amount of current being fed to the electric motor 67, hence the speed at which the electric motor will operate. Various electrical components may be interposed within the external circuit to influence the system and the current flowing through the external circuit. For example, as depicted in FIG. 2, a generator/alternator 86 generates a charging current to be fed to the battery pack 12. As necessary, over time, the battery pack 12 may be further recharged employing an external power source.

In several embodiments, the electrolysis unit 14 generates a substantial volume of fuel gas through electrolysis of the electrolyte 18. For example, in one embodiment, such electrolysis of the electrolyte 18 produces quantities of hydrogen, oxygen and water vapor. In several embodiments, the first tank 16 is a closed vessel, such that the fuel gas produced may be vented from the first tank 16 as by way of a vent tube 88 disposed in the top end of the first tank 16. In the embodiment of FIG. 2, the fuel gas generated in the electrolysis unit 14 is fed from the first tank 16, as by a conduit 91 in fluid communication with the vent tube 88, to a fuel input of an ICE 92 for use as fuel for the operation of the ICE 92. In certain embodiments, an output drive shaft 96 of the ICE 92 is configured via suitable mechanical connections to drive operation of the generator/alternator 86, which in turn is configured to provide electricity to recharge the battery 12 fueling electrolysis in the electrolysis unit 14 as discussed above.

It will be recognized that, in several applications, the relative sizes of the various components of the apparatus of the present invention may be configured for use of the apparatus of the present invention as a power source in a vehicle, such as for example an automobile. For example, in one specific example of the present invention, the electric motor 67 and associated battery 12 are sized sufficiently that an output of the electric motor 67 may be configured to engage and operate the drive train of an electric vehicle. In this embodiment, movement of the second electrode 42 between the first and second positions 48, 56 serves to vary the speed of the electric motor 67 to allow control of the speed of the vehicle between desired minimum and maximum speeds. In this embodiment, the ICE 92 and associated generator/alternator 86 are of a sufficient size and configuration to provide electricity to the battery 12 sufficient to maintain charge of the battery 12 throughout electrolysis of the electrolyte 18. The first tank 16 and its associated first and second electrodes 28, 42 are sized to hold a quantity of electrolyte 18 and to perform electrolysis of the electrolyte 18 within the first tank 16 such that the fuel gas produced by electrolysis of the electrolyte 18 is sufficient to serve as a sole source of fuel for the ICE 92. Thus, the electrolyte 18 serves as a sole source of fuel for operation of the vehicle. It will be recognized by one of skill in the art that selection of the relative sizes of the various components of the apparatus of the present invention sufficient for use in operation of a vehicle is a function of numerous factors, including but not limited to the overall size (mass) of the vehicle to be operated by the apparatus of the present invention and the desired fuel capacity of electrolyte 18 within the first and second tanks 16, 32.

In one specific example of the present invention, there was provided an electrolysis unit comprising a first tank which was 18 inches high, 4 inches wide and 18 inches deep. Approximately 4 gallons of electrolyte was disposed within this first tank. First and second plates of cold rolled steel served as the first and second plates of the first electrode. Each of these plates was 12 inches long, 4 inches wide and 0.5 inches thick. Each of these plates was mounted to their respective side wall of the first tank as by means of adjustable bolts 96 (typical). These plates occupied substantially parallel planes and were spaced apart and in substantially full register with one another. The spacing between the plates was adjusted to between about 0.75 inch and about 1.0 inch. The second electrode was of like size, geometry and composition as one of the plates of the first electrode. Thus, when the second electrode was disposed in the space between the first and second plates of the first electrode, there was defined an available ion and electron flow path between the first and second electrodes of about 0.125 inch on either of the opposite sides of the second electrode. Employing a 48 volt battery pack, through the mechanism of adjusting the spatial relationship of the first and second electrodes to provide more or less registration of these electrodes, plus more or less immersion of the second electrode within the electrolyte, the rate of progression of the electrolysis taking place within the first tank of this example was adjusted to produce an electrical current output of between about 100 amperes and about 800 amperes. Adjustment of this unit allows it to handle up to 3000 amperes. A similar unit of larger construction may be expected to handle amperages up to 8000 amperes. At any given level of throughput within this range of throughputs, the electrical throughput from the electrolysis unit was substantially constant.

Whereas the composition of the electrolyte 18 employed in the present invention may vary, in one example, the electrolyte included one pound of common table salt (sodium chloride), two fluid ounces of turpentine, and one quart of denatured ethyl alcohol per each 20 gallons of water. Variations in the relative amounts of each of the listed ingredients of the electrolyte employed as well as the addition of other additives to the water and salt mixture were also found usable. The above example has proven to be more than adequate for the production of sufficient fuel gas to successfully provide sustained operation of a 5 hp electric motor and an internal combustion engine of between about 250 cc displacement to about 5700 cc displacement in a system employing the present motor control for adjustment of the electric motor operation and the provision of fuel gas for fueling the operation of the ICE. In this example, after the electric motor was employed to start the ICE and sustain such operation until sufficient fuel gas was being produced for sustaining the operation of the ICE (usually less than about 15 seconds), the electric motor was dropped out of the system and the ICE continued to operate and provide strong power output for extended periods of time, e.g. for several hours, under load. In this example, the reserve tank contained 20 gallons of electrolyte which was pumped by the electrically-driven pump 35, between the first and second tanks at the rate of about 2.5 gallons per minute. This operation of the pump was controlled by a thermostat and the flow rate varied as needed to maintain the temperature of the electrolyte in the first tank at about 150 degrees Fahrenheit.

It will be noted that in the prior art of electric motor controllers there must be provided one controller for each motor when operating multiple motors unless the motors are connected in series. When so connected in series, there exists the problem that when one of the motors loses its load (such as one of the wheels of a vehicle losing its traction), all of the current is directed to this motor to the exclusion of current to the other motors, making serial connection of multiple motors most undesirable. Contrariwise, in the present invention, when employing multiple motors, only one of the electrolysis unit 14 may be employed as a controller for multiple electric motors when the motors are connected in parallel. In this arrangement, when power to one of the motors is lost, that power which previously was flowing to the now defunct motor shifts to the remaining ones of the multiple motors so long as these remaining motors remain under load.

Further, whereas electronic controllers of the prior art commonly operate within the range of 800 to 1000 amps, the present electrolysis unit 14 successfully operates within the range of 2400 to 3000 amps. Within the present electrolysis unit 14, arcing resulting from overvoltages is substantially immaterial, in that the present apparatus can absorb such over-voltages without material damage to the electrodes of the electrolysis unit 14. Additionally, in contrast to the prior art, which includes controllers for permanent magnet motors which employ a "chopping" concept, the present invention may be employed to control permanent magnet motors with a substantially constant electrical input to the motor in that the present controller does not produce a "pulsed" throughput.

In a further example, 4 gallons of electrolyte as described hereinabove were loaded into a single tank 16 inches high, 18 inches long and 4 inches wide. The first and second electrodes were electrically connected to a 48 volt battery pack. With no variable voltage provision, the fuel gas output from the electrolysis unit was sufficient to provide the sole source of fuel to successfully operate a 262 cc, 2-cylinder, 4-cycle, overhead valve internal combustion engine for more than 10 hours of continuous operation. In this example, no electric motor was incorporated in the circuit so that the engine was hand-cranked to start the same.

Employing a system as depicted in FIGS. 2-4, when the system is started, the level of electrical activity within the electrolysis unit 14 of the present invention is used to control the operational speed of the electric motor 67. In one embodiment, the electric motor 67 is connected to the ICE 92 through a mechanical coupling, thereby providing starting energy to the ICE 92. The intake suction of the ICE 92 draws fuel gas from the electrolysis unit 14 to commence operation of the ICE 92 which then takes the place of being the primary source of throughput power for the system, as supplemented as needed by the power from the electric motor 67. An alternator 86 is coupled to the output shaft 96 of the ICE 92. In one embodiment, one 12-volt alternator 86 with a rating of 100 amps is provided for each 12 volts of the battery pack 12. The batteries 12 of this system are recharged as the apparatus of the present invention operates. This is found to be especially effective during idling periods and during other periods when the system of FIGS. 2-4 has less than a full load. In certain embodiments, the coupling 74 between the electric motor 67 and the ICE 92 is provided with a clutch 94 to isolate the electric motor 67 from the ICE 92 as desired.

The following tests were conducted employing various of the concepts of the present invention.

Test #1

The following tests were conducted employing various of the concepts of the present invention as embodied in a test vehicle. This test apparatus included:

a) 3340 lb minivan having 10 inch diameter wheels, a 262 cc displacement, 2-cylinder, air cooled, overhead valve engine originally adapted to be fueled by conventional gasoline fed to the engine through a conventional carburetor, and an output power shaft from which the power was transferred to the rear wheels of the minivan through belts, b) a 96 volt battery pack disposed wholly within the minivan, c) a conventional alternating current generator with an output of 120 volts at a continuous rating of 7500 watts and with a separate battery charging system from the generator to the battery pack and operatively connected to the drive shaft of the engine, d) a fuel gas/motor controller unit of the type described above mounted wholly within the minivan, this unit including an electrolysis subassembly containing an electrolyte mixture of the present invention, a stationary dual-plate electrode disposed within the electrolyte, a movably electrode mounted for movement into and out of the electrolyte and adjustment of the physical spatial relationship between the stationary and movable electrode, e) a 5 hp direct current electric motor that is in the electrical circuit with the battery and the electrolysis unit, and is in a mechanically operative relationship with the main shaft of the ICE, f) an electrical lead connecting the movable electrode to the positive terminal of the electric motor, g) an electrical lead connecting the negative terminal of the electric motor to the positive post of the battery pack, h) an electrical lead connecting the negative post of the battery pack to the stationary electrode of the electrolysis subassembly, and i) a fuel gas feed line connecting the output vent of the electrolysis subassembly to the carburetor of the engine.

The foregoing described test apparatus was operated as follows:

a) The system startup included partial movement of the movable electrode of the electric motor controller/fuel gas generator into the electrolyte. The electrolysis began to produce the fuel gas and permitted an electrical current to be fed from the battery pack to the 5 hp electric motor, causing the motor to commence operation. By reason of the physical interconnection of the electric motor and the ICE, the ICE commenced cycling. The effluent fuel gas from the electric motor controller/fuel gas generation was pulled into the carburetor of the ICE and the ICE began to operate. This "startup" process consumed about 28 seconds. Multiple testing has shown that this startup time may vary with the operating conditions of the overall system and particularly the operating temperature of the electrolyte. For example, at temperatures above about 160 degrees Fahrenheit, the ICE loses some of its efficiency, and, b) Following startup of the ICE using solely the fuel gas generated within the electrolysis subassembly, (no other fuel was onboard the vehicle) the vehicle was driven out of the shop under its own power to a nearby road. On the road, the vehicle was driven 4.2 miles at approximately 20 mph without changing the gear ratio from the ICE to the rear wheels.

Prior to the startup, the battery pack voltage was 97 volts. This voltage dropped to 91 volts at the time the ICE started, but rose to and held at 107 volts during the test run of the ICE. At the end of the test run of the ICE, the battery pack voltage was 97 volts, thereby indicating the ability of the generator to recharge the battery pack during the over-the-road operation of the vehicle.

Test #2

Employing the same apparatus as described in Test #1 above, the ICE was powered and employed in a test run on a road for 8.4 miles at an average speed of 20 mph. The maximum temperature of the electrolyte was 207 degrees Fahrenheit, indicating the need to maintain the temperature of the electrolyte at a lower temperature. At the beginning of this test, the battery pack was at 101 volts and at the end of the run, this voltage was also at 101 volts.

Test #3

A further test was conducted employing the method and apparatus described in Test #1 except one change was made. In this Test #3, the 5 hp electric motor was excluded from the overall system. Thus, the only component in the electrical circuit was the fuel gas generator. The power plant for the vehicle, therefore, was driven solely by the ICE which, in turn, was solely fueled by the fuel gas generated by the electrolysis subassembly.

In this test, the ICE was started by physically pushing the vehicle after allowing time for adequate fuel gas to be generated. The length of this test run was 0.7 miles on a road. Throughout this test, the ICE powered the vehicle very well. Throughout this test, the temperature of the electrolyte remained at approximately 135 degrees Fahrenheit. This reduction in temperature of the electrolyte during this test over the temperature of the electrolyte during Test #2 was attributed to the absence of the electric motor in the system so that the required rate of electrolysis was less than in Test #2. At this lower temperature, there was found to be sufficient fuel gas generation as needed to fuel the ICE.

In this Test #3, at the commencement of the test, the battery pack voltage was 107 volts. At the end of the test, the battery pack also indicated a voltage of 107 volts.

Test #4

This test was conducted within the shop. Employing the method and apparatus described in Test #1 above, the ICE was started (with the 5 hp electric motor in the circuit). In this test, when the ICE commenced operating, the 5 hp direct current electric motor was switched out of the circuit and the motor controller/fuel gas generator was switched into a 120 volt alternating circuit from the generator as described in Test #1. That is, the power for operation of the electrolysis subassembly was derived solely from the 120 volt alternating current from the generator, as opposed to power from the battery pack. Under these conditions, the ICE was operated continuously for 2.75 hours. During this test, it was found that an electrolyte temperature of between about 135 degrees Fahrenheit and about 160 degrees Fahrenheit appeared to be most acceptable. In this test, above about 160 degrees Fahrenheit the ICE lost some of its efficiency.

At the commencement of operation of the ICE of Test #4, the battery pack voltage was 73 volts. When the ICE was stopped after 2.75 hours of operation, the battery pack voltage was 101.5 volts.

Test #5

In Test #4, it was theorized that excess water spray was possibly being conveyed to the ICE carburetor in the fuel gas stream. The overall system as described in Test #1 was modified by the incorporation into the system of a water spray "trap" intermediate to the fuel gas generator and the engine carburetor. This trap comprised a 4 inch diameter PVC outer tube within which there was mounted an aluminum tube having holes drilled through its thickness along a top side thereof. In this apparatus, the fuel gas stream from the electrolysis subassembly was fed into one end of the PVC pipe whereupon the lighter gas(es) in the fuel gas stream rose to the top of the outer tube and were drawn into the inner aluminum tube through the holes drilled in the top side of the aluminum tube, thence on to the ICE carburetor. The heavier gas(es), and especially the water content of the fuel gas stream from the generator, which were extracted out of the fuel gas stream were discharged from the PVC tube to ambient environment. Regulation of the mixture of air and fuel gas to the ICE carburetor was accomplished by placement of a butterfly valve in the "entrance" end of the aluminum tube which was mounted within the PVC pipe. This modification appeared to enhance the operation of the ICE.

Test #6

From earlier tests, it appeared that even though the operating temperature of the electrolyte should be maintained between about 135 degrees Fahrenheit and about 160 degrees Fahrenheit, the ICE operation was enhanced when the temperature of the fuel gas/air mixture fed into the ICE carburetor was at a higher temperature within this range. Especially, spark ignition within the ICE of the fuel gas/air mixture from the carburetor appeared to be more effective, producing enhanced throughput power and smoother operation of the ICE.

Accordingly, the system described in Test #1 was modified to add a heat exchanger intermediate to the motor controller/fuel gas subassembly and the intake manifold of the ICE. In one embodiment, this heat exchanger comprised coiling the tubular feed line of the fuel gas to the carburetor around the exhaust manifold of the ICE so that the fuel gas being fed to the intake manifold was heated to a higher temperature than the temperature of the fuel gas exiting the motor controller/fuel gas generator subassembly. Whereas this embodiment was expedient for the test, it will be recognized that an independent heat exchanger of conventional design may be substituted for the coiling of the fuel gas feed line about the exhaust manifold of the ICE. Moreover, such an independent heat exchanger would provide better control, including consistency, over the exact temperature of the fuel gas stream entering the carburetor.

Test #7

A 1995, 5.7 liter, Chevrolet Tahoe engine with a single 12 volt standard battery and a standard 110 amp alternator to recharge the battery was used for this test. A 120 volt alternating current inverter that converted 12 volt direct current from the battery to 120 volt alternating current with a maximum continuous operating rating of 2000 watts was used to supply energy for the electrolysis. The electricity to the electrolysis unit was controlled by a 2000 ampere maximum rated rheostat. A small electrolysis unit was used that was contained in an 8 inch high by 3.5 inch diameter glass vessel. The electrodes were 0.25 inch iron rods inserted from the top of the vessel. The distance between the electrodes was not variable. A heat exchanger was used, as described in Test #6 to pre-heat the fuel gas before it entered the intake manifold. The fuel gas produced was not enough to totally power the vehicle but was used in combination with gasoline. A 500 mile trip was made with the system. The battery maintained a charge level equal to or above the 12 volt level. The same 500 mile trip, on several previous occasions in the Tahoe vehicle of this test, had required more than 30 gallons of gasoline. This test trip required only approximately 10 gallons of gasoline and approximately 7 gallons of electrolyte mixture. In each of the tests recorded hereinabove, the output of fuel gas from the motor controller/fuel gas generator was regulated to produce that volume of fuel gas necessary to operate the ICE at a desired rpm, much in the nature of the function of the accelerator of a conventional motor vehicle equipped with an ICE.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An apparatus for providing mechanical energy comprising:
   a battery;
   an electrolysis unit comprising:
      a tank for containing a quantity of electrolyte;
      a first electrode disposed within said electrolyte; and
      a second electrode movable between a first position outside said electrolyte in said tank and a second position at least partially within said electrolyte in said tank such that electrolysis unit directs electrical current from said battery through said first and second electrodes when said second electrode is in said second position, thereby causing electrolysis of at least a portion of said electrolyte to produce a quantity of fuel gas;

an internal combustion engine having a fuel input to receive said fuel gas, said tank defining a conduit for directing said fuel gas from said tank to said fuel input to fuel said internal combustion engine; and a generator configured to charge said battery.

2. The apparatus of claim 1 wherein said first electrode comprises first and second plates spaced apart from one another and occupying substantially parallel planes, said first and second plates being electrically connected to collectively define said first electrode.

3. The apparatus of claim 2 wherein said second electrode is between said first and second plates in said second position.

4. The apparatus of claim 2 wherein said resultant throughput of electrical current is enhanced as said second electrode is moved within said electrolyte in a direction toward contiguity to and between said first and second plates of said first electrode.

5. The apparatus of claim 1, said electrical current being directed from said electrolysis unit to operate an electric motor.

6. The apparatus of claim 5, wherein movement of said second electrode between said first and second positions provides selective control of an operational speed of said electric motor.

7. The apparatus of claim 5, said generator being driven by at least one of a mechanical output of said electric motor and a mechanical output of said internal combustion engine.

8. The apparatus of claim 7, said generator being driven by said internal combustion engine.

9. The apparatus of claim 8, said electric motor being configured to supply mechanical energy for movement of a vehicle.

10. The apparatus of claim 9, said generator comprising a vehicle alternator.

11. The apparatus of claim 8, said electric motor being configured to supply mechanical energy for powering at least one of a vehicle, a stationary unit, or a mobile unit.

12. The apparatus of claim 1 wherein said fuel gas is a sole source of fuel for operation of said internal combustion engine.

13. The apparatus of claim 1 wherein an operational speed of said internal combustion engine is determined as a function of said quantity of fuel gas supplied to said internal combustion engine per unit of time.

14. The apparatus of claim 1, said fuel gas being a mixture of hydrogen and oxygen.

15. The apparatus of claim 1, said electrolyte comprising sodium chloride, turpentine, denatured ethyl alcohol, and water.

16. The apparatus of claim 15, said electrolyte comprising approximately one pound of sodium chloride, two fluid ounces of turpentine, and one quart of denatured ethyl alcohol per 20 gallons of water.

17. The apparatus of claim 1, said electrolyte being a solution comprising water and at least one additive that causes said solution to be conductive and, in combination with said electrodes, provides electrolysis and resultant hydrogen and oxygen gas.

18. An apparatus for providing mechanical energy comprising:

a battery;

an electrolysis unit comprising:
- a tank for containing a quantity of electrolyte;
- a first electrode disposed within said electrolyte; and
- a second electrode movable between a first position outside said electrolyte in said tank and a second position at least partially within said electrolyte in said tank such that electrolysis unit directs electrical current from said battery through said first and second electrodes when said second electrode is in said second position, thereby causing electrolysis of at least a portion of said electrolyte to produce a quantity of fuel gas;

an internal combustion engine having a fuel input in fluid communication with said tank to receive said fuel gas, said internal combustion engine being fueled solely by said fuel gas;

a generator powered by said internal combustion engine to charge said battery; and an electric motor, said electrolysis unit being configured to direct electrical current from said first and second electrodes to said electric motor to power said electric motor;

whereby movement of said second electrode between said first position and said second position controls the rate of production of said fuel gas and the rate of current flowing to said electric motor, thereby allowing for selective control of an operating speed of said electric motor and an operating speed of said internal combustion engine.

* * * * *